United States Patent
Talukdar et al.

(10) Patent No.: US 10,691,584 B2
(45) Date of Patent: Jun. 23, 2020

(54) BEHAVIOR DRIVEN DEVELOPMENT INTEGRATION WITH TEST TOOL

(71) Applicant: SAP SE, Walldorf (DE)

(72) Inventors: Bandita Talukdar, Guwahati (IN); Smrithi Jayarajan, Kannur (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/146,188

(22) Filed: Sep. 28, 2018

(65) Prior Publication Data
US 2020/0104241 A1     Apr. 2, 2020

(51) Int. Cl.
| | |
|---|---|
| G06F 11/36 | (2006.01) |
| G06F 8/30 | (2018.01) |
| G06F 16/84 | (2019.01) |
| G06F 40/151 | (2020.01) |
| G06F 40/284 | (2020.01) |

(52) U.S. Cl.
CPC ............ *G06F 11/3684* (2013.01); *G06F 8/30* (2013.01); *G06F 11/3696* (2013.01); *G06F 16/86* (2019.01); *G06F 40/151* (2020.01); *G06F 40/284* (2020.01)

(58) Field of Classification Search
CPC ........ G06F 8/30; G06F 16/86; G06F 17/2264; G06F 17/277; G06F 8/40–8/437; G06F 11/36–11/3696
USPC .................................................. 717/124–135
See application file for complete search history.

(56) References Cited

U.S. PATENT DOCUMENTS

| | | | | |
|---|---|---|---|---|
| 6,523,172 | B1 * | 2/2003 | Martinez-Guerra | G06F 8/427 704/9 |
| 6,701,514 | B1 * | 3/2004 | Haswell | G06F 11/3664 707/999.102 |
| 6,907,546 | B1 * | 6/2005 | Haswell | G06F 11/3684 714/38.11 |
| 7,653,896 | B2 * | 1/2010 | Herdeg, III | G06F 9/45512 717/113 |
| 8,756,571 | B2 * | 6/2014 | Bergman | G06F 11/3684 717/124 |
| 9,047,414 | B1 * | 6/2015 | Matyjek | G06F 11/3688 |
| 9,710,367 | B1 * | 7/2017 | Nagineni | G06F 11/3684 |
| 10,339,036 | B2 * | 7/2019 | Dwarakanath | G06F 11/3684 |

(Continued)

OTHER PUBLICATIONS

R. Bussenot, H. Leblanc and C. Percebois, "Orchestration of Domain Specific Test Languages with a Behavior Driven Development approach," 2018 13th Annual Conference on System of Systems Engineering (SoSE), Paris, 2018, pp. 431-437. (Year: 2018).*

(Continued)

*Primary Examiner* — Andrew M. Lyons
(74) *Attorney, Agent, or Firm* — Buckley, Maschoff & Talwalkar LLC (57) ABSTRACT

According to some embodiments, systems and methods are provided, comprising receiving a first test script in a file as text; receiving the file at a Behavior Driven Development (BDD) test integration module; transforming one or more elements in the test script into one or more corresponding tokens; mapping each of the tokens to a respective code in a code repository; generating a second test script from the code; transforming the generated second test script into natural language; and executing the generated second test script. Numerous other aspects are provided.

21 Claims, 6 Drawing Sheets

(56) References Cited

U.S. PATENT DOCUMENTS

| | | | | |
|---|---|---|---|---|
| 10,346,140 | B2* | 7/2019 | Johnson | G06F 11/3608 |
| 2004/0102978 | A1* | 5/2004 | Gygi | G06F 11/3664 |
| | | | | 704/275 |
| 2007/0067755 | A1* | 3/2007 | Hinchey | G06F 8/10 |
| | | | | 717/135 |
| 2007/0074180 | A1* | 3/2007 | Hinchey | G06F 8/10 |
| | | | | 717/136 |
| 2007/0101196 | A1* | 5/2007 | Rogers | G06F 11/3688 |
| | | | | 714/38.14 |
| 2008/0126080 | A1* | 5/2008 | Saldanha | G06F 17/2229 |
| | | | | 704/9 |
| 2008/0307400 | A1* | 12/2008 | Dalal | G06F 40/40 |
| | | | | 717/142 |
| 2009/0210855 | A1* | 8/2009 | Ramanathan | G06F 8/36 |
| | | | | 717/102 |
| 2013/0019116 | A1* | 1/2013 | Ochi | G06F 1/3284 |
| | | | | 713/323 |
| 2013/0097586 | A1* | 4/2013 | Chandra | G06F 11/3684 |
| | | | | 717/124 |
| 2013/0263099 | A1* | 10/2013 | Box | G06F 8/42 |
| | | | | 717/144 |
| 2014/0019116 | A1* | 1/2014 | Lundberg | G06F 40/58 |
| | | | | 704/8 |
| 2014/0068570 | A1* | 3/2014 | Cox | G06F 8/44 |
| | | | | 717/137 |
| 2015/0261660 | A1* | 9/2015 | Shiraishi | G06F 11/3692 |
| | | | | 714/38.1 |
| 2016/0004622 | A1* | 1/2016 | Kaulgud | G06F 11/3684 |
| | | | | 717/132 |
| 2016/0283353 | A1* | 9/2016 | Owen | G06F 11/3664 |
| 2016/0357519 | A1* | 12/2016 | Vargas | G06F 40/40 |
| 2017/0329687 | A1* | 11/2017 | Chorley | G06F 11/263 |
| 2018/0011780 | A1* | 1/2018 | Aggarwal | G06F 11/3672 |
| 2018/0052663 | A1* | 2/2018 | Castelli | G06F 11/36 |
| 2018/0067836 | A1* | 3/2018 | Apkon | G06F 8/34 |
| 2018/0137036 | A1* | 5/2018 | Shani | G06F 11/3684 |
| 2018/0267887 | A1* | 9/2018 | Dsouza | G06F 11/3684 |
| 2018/0275989 | A1* | 9/2018 | Kakkad | G06F 11/3684 |
| 2018/0285248 | A1* | 10/2018 | Gupta | G06F 11/3684 |
| 2018/0300318 | A1* | 10/2018 | Sittel | G06F 11/362 |
| 2018/0349256 | A1* | 12/2018 | Fong | G06F 11/3684 |
| 2018/0373620 | A1* | 12/2018 | Thomson | G06F 11/3684 |
| 2019/0171553 | A1* | 6/2019 | Chauhan | G06N 20/00 |
| 2019/0179732 | A1* | 6/2019 | Venkatasubramanian | |
| | | | | G06N 20/00 |
| 2019/0213116 | A1* | 7/2019 | Kulkarni | G06F 11/3684 |
| 2019/0272158 | A1* | 9/2019 | Ueda | G06F 8/433 |
| 2020/0019492 | A1* | 1/2020 | Fei | G06F 9/45512 |

OTHER PUBLICATIONS

W. Dong, "Test Case Generation Method for BPEL-Based Testing," 2009 International Conference on Computational Intelligence and Natural Computing, Wuhan, 2009, pp. 467-470. (Year: 2009).*

* cited by examiner

BEHAVIOR DRIVEN DEVELOPMENT INTEGRATION WITH TEST TOOL

BACKGROUND

During development of applications, developers often use record-and-playback test scripts to determine whether different features of the application perform as intended when the application is executed. The record-and-playback test scripts include different operational scenarios, each for testing a different feature. Typically, to create a record-and-playback test script for a given feature, a record-and-playback tool may be used to record a tester's actions. The tester or user performs each step as per the scenario, which is then recorded by the tool. The recorded steps form an automated record-and-playback test script. Thereafter, whenever that particular scenario has to be tested, the automated test case may be played back or executed, and manually checking the recorded scenarios is not necessary. Often applications may be re-released as the features in the application are modified. As such, the record-and-playback test scripts may be outdated after a few releases, as the features are modified. Modification of the record-and-playback test scripts includes re-recording the actions to take the modified features into account, which may be very time consuming.

Systems and methods are desired which support efficient modification of record-and-playback test scripts.

DETAILED DESCRIPTION

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

During development of an application, an organization may respond to changing user needs by maintaining and changing the application. As the application changes with each succeeding release thereof, the new features need to be tested with test scripts or cases. As used herein, the terms "test script" and "test case" may be used interchangeably. The test cases check the functionality of the new features, as well as determine whether the new feature has changed any existing functionality. By re-running testing scenarios that were originally scripted when known problems were first fixed, or features introduced, developers make sure that any new changes to an application haven't resulted in any regression issue, or caused components that formerly worked to fail. Such tests may be performed manually on small projects, but in most cases repeating a suite of tests each time an update is made is too time-consuming and complicated to consider, so an organization may use an automated testing tool. The automated testing tool may use automated test scenarios to check new iterations of code against previous software baselines or control states, highlighting inconsistencies in testing logs and specifying exactly where an unexpected function broke and why. In one or more embodiments, the automated test suite which includes the new features developed in each iteration may be run periodically later as per need (weekly/monthly) to ensure that application is stable.

Often developers may use record-and-playback test scripts to determine whether a given feature of the application performs as intended when the application is executed. The record-and-playback test scripts may be the test script that is then used by the automated testing tool. The script may be stored in a feature file. Typically, a record-and-playback feature file includes a script, which may be a record of each action performed by a tester or user at an earlier time as the tester or user performed each step of a scenario designed to test the given feature. As a non-exhaustive example, a record-and-playback feature file to test a given feature may include one hundred actions. When the application is modified (e.g., features are changed to fix a problem, updated (e.g., buttons maybe added/removed), the process steps change etc.), the record-and-playback script may be outdated if that feature has changed.

Typically, modification of the record-and-playback test scripts includes re-recording the actions to take the modified features into account. Continuing with the non-exhaustive example, in a record-and-playback test script with one hundred actions, there may be a change at action 95. However, all one hundred actions may need to be re-recorded, which may be very time consuming. Additionally, this makes the scripts bulky and difficult to debug and analyze. Recording may make a script bulky as extra steps which have to be performed to record the intended step may also get added to the existing script, and a user has to be extra careful to prevent this from happening. There also may be changes that have to be made in the existing scenario where some steps have to be replaced by new steps. In this case, the user also records the new steps and then carefully deletes the existing steps so as not to make any unintended changes to the script. Such scenarios are often difficult to debug as both the old and new steps may have same description in the START file (e.g., "click on login button"). Here the description will remain same even though the step has to be re-recorded due to some change in the id of the button or position. If user deletes the wrong step by mistake, then it may be very difficult to debug].

Behavior-driven development (BDD) may be an application development process that uses specialized software tools to support the application development process, including testing of the application features via test scripts, such as record-and-playback test scripts. The BDD framework often takes test cases written in an organization-specific language and converts them to automated test scripts written in programming languages (e.g., JAVA®, PYTHON®, etc.). As such, the test script is not modified by re-recording the steps, and instead may be modified by a user with enough proficiency to be able to form test scenarios in a BDD framework to change the script. However, the typical tester is not proficient in programming languages. As used herein, "programming language" may refer to a set of commands, instructions, and other syntax used to create a software program. Examples include, but are not limited to, JAVA, Python, BASIC, C, C++, COBOL, FORTRAN, Ada, and Pascal.

Additionally, the current BDD approach limits a user (e.g., business user or customer or product expert who also perform tests on the application or forms test scenarios and gives them to the testers) to only creating or editing the feature files which contain the test cases. Now their role may be expanded to actual test management i.e., verifying the actual scenarios within the feature files and ensuring good test coverage or making changes directly to the test scenarios by editing the feature files as they are in plain English and not in any particular programming language, thus connecting them to the entire software development life cycle.

One or more embodiments provide for a Behavior Driven Development (BDD) test integration module that may provide an executable test script file that may be created using a natural-language (e.g., English) structured format, instead of the conventional record-and-playback tool or organization specific language. In one or more embodiments, the steps to be performed by a tester/user may first be received in a file having the natural-language structured format ("feature file"). In this format, the steps may be edited and/or otherwise manipulated by a user. As used herein, the terms "user" and "tester" may be used interchangeably. As used herein, the terms "actions" and "steps" may be used interchangeably. Then these steps may be transformed into an executable code in a programming language. The executable code may next be transformed into a human-readable form (e.g., natural language) for easier confirmation of the steps in the test script. The human-readable form may hide the actual code from the user and instead show straightforward step descriptions in layman terms (e.g., closer to natural language). The inventors note that the use of natural language is unlike the typical BDD test scripts that are written in organization specific languages.

When the user confirms the steps in test script are correct, based on the human-readable form, the executable code in the programming language may be executed. In one or more embodiments, an easily readable scenario results in an easy-to-understand automated test script. The easy-to-understand test scripts may make it more apparent to a product expert that the test script is closely aligned with the organization requirements, thereby making review of the test script and updating of the test script easier for the product experts, who may not be experienced with programming language. One or more embodiments provide for an automated test script which does not require technical expertise/coding knowledge to maintain and upgrade the test script by combining BDD structure with an automated regression testing tool. It is noted that the manipulation (e.g., editing) of the feature file by the user, as described by one or more embodiments, may be faster than finding and fixing a script failure point in a record-and-playback file. Additionally, the feature file may serve as documentation for the automated regression testing tool. The feature files may be used as test case documents themselves since they are in English format, unlike in conventional scenarios where automated scripts and test cases are maintained separately. These documents may be used for educating new testers or users of the application, and also may be used as a baseline reference point for enhancements, as the test coverage may be identified very easily. The inventors further note that one or more embodiments may facilitate collaboration between users and developers as the test cases may be written in, or include, a language more-easily understood by both parties, as opposed to being solely written in a programming language.

FIGS. 1-4 include flow diagrams of a process 400 (FIG. 4) for generating an executable test script in a non-programming language according to some embodiments. Process 400 may be executed by application server 530 according to some embodiments. In one or more embodiments, the application server 530 may be conditioned to perform the process 400, such that a processor 610 (FIG. 6) of the server 530 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

User interface 300 (FIG. 3) may be presented on any type of display apparatus (e.g., desktop monitor, smartphone display, tablet display) provided by any type of device (e.g., desktop system, smartphone, tablet computer). One or more embodiments may include a UI renderer (not shown) which is executed to provide user interface 300 and may comprise a Web Browser, a standalone application, or any other application. Embodiments are not limited to user interface 300 of FIG. 3.

Figure 4:
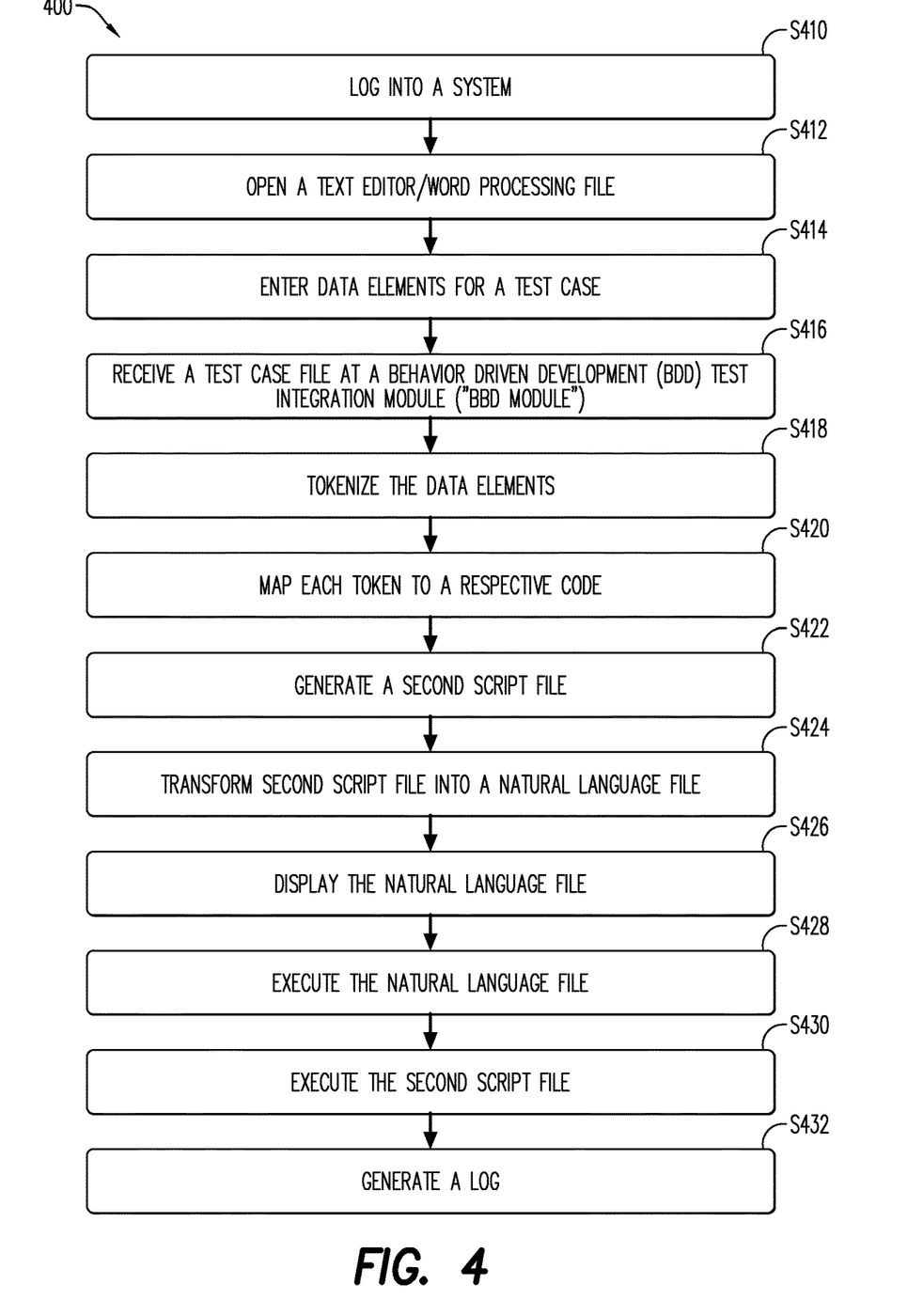
FIG. 4 is a flow diagram of a process according to some embodiments.
Figure 5:
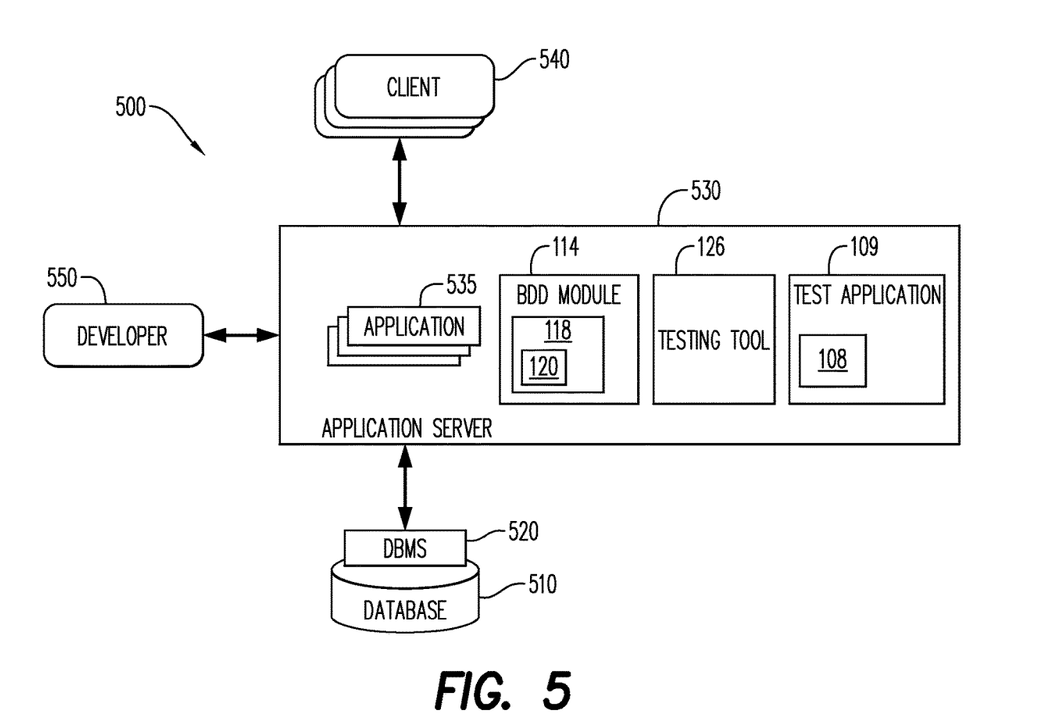
FIG. 5 is block diagram of a system architecture according to some embodiments.

Initially, at S410, a user 102 logs into a system 100/500 (FIGS. 1/5) to create an executable test case 104 for an application under test 106. In one or more embodiments, the application under test 106 may include a user interface with one or more data-entry fields. Data received in the one or more data-entry fields may be used to test the application. One or more embodiments may also support performance tests, and any other test supported by a Simple Test Automation for Regression Testing (START) tool.

Figure 1:
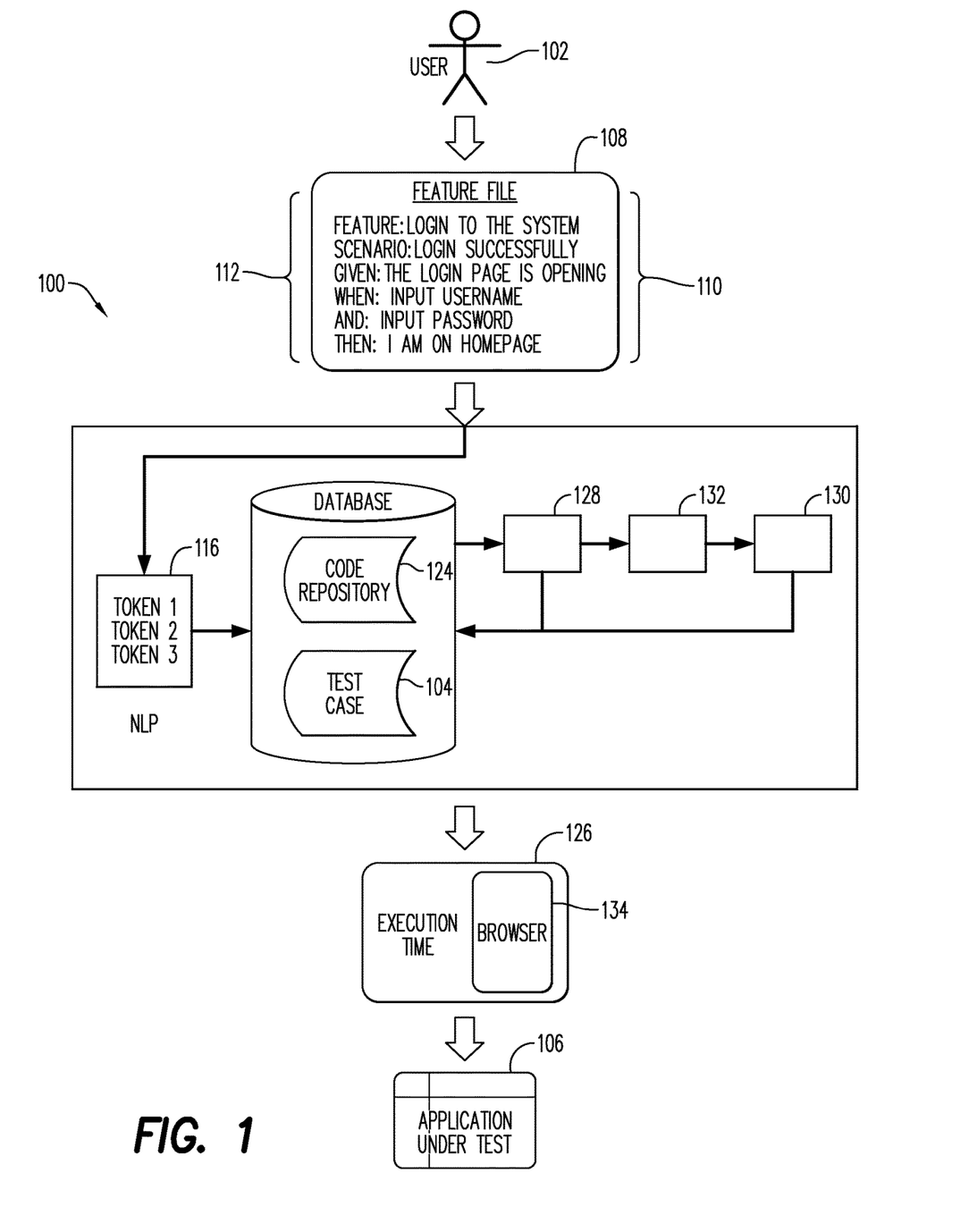
FIG. 1 is a block diagram of a system architecture according to some embodiments.

Then, at S412, the user 102 opens a text editor/word processing file 108 in a text application 109. As a non-exhaustive example, the text editor/word processing file 108 may be Microsoft NOTEPAD®, Microsoft WORD®, Open office writer, TextEdit, NewOfficeWriter, OpenOfficeWriter or any other suitable text editor/word processing file. The user 102 then enters data elements 110 ("input") for the test case 104 into the file 108 as text in S414. In one or more embodiments, the user 102 may enter input to create a new test case or may enter input to edit an existing test script. In one or more embodiments, the user may automatically, or otherwise, import an existing test script form another source by any suitable process. In one or more embodiments, the user input 110 may be in a free-form text, however, in one or more embodiments, the free-form user input 110 may be entered in a structured language format that follows a pre-set syntax, such as Gherkin. While Gherkin may be used in the non-exhaustive examples described herein, other suitable structured languages may be used.

Gherkin contains a set of keywords 112 which may define different premises of a scenario. The Gherkin structure may allow the text to be written in plain language (e.g., plain English). The plain language is a communication the reader can understand the first time they read or hear it, which may facilitate communications between the users and developers. The Gherkin structure may also allow for the test case to be read in an automated way, thereby creating automation tests that at the same time describe the scenario, in one or more embodiments. The keywords 112 may include Feature, Scenario, Steps (Given, When, Then, And, But), Background, Scenario Outline, and Examples. Each line in the file 108 may begin with a keyword 112, and the user input 110 after the keyword may be in plain language.

As used herein, "Feature" may refer to a particular application behavior, like login. Scenarios are the various situations that a feature can handle, for example incorrect password, or any other suitable scenario. "Scenario" may describe the use case to be tested and may consist of steps. It is noted that the scenario may be a positive or negative scenario. As a non-exhaustive example, a positive scenario may be when the scenario is to login to a system successfully, and a negative scenario may be when there is an incorrect username or password. The "steps" may be the actions to be performed and may further be categorized using the following keywords 112: given, when, and, then. "Given" may refer to the initial precondition to be satisfied so that the user 102 may execute the next step. "When" may refer to the actual actions to be performed. Multiple "When" statements may be written using an "AND" keyword. "Then" may refer to the expected outcome, and may include multiple outcomes using an "AND" keyword.

In one or more embodiments, the file 108 may include descriptions that may be added to a Feature, Scenario, Scenario Outline or Examples, but cannot start with a keyword. In one or more embodiments "Description" may help in giving context to the Gherkin feature file and may help any user understand what a particular feature, scenario, etc. is. In the below non-exhaustive example, the "description" may be "The application under test in Shopping cart and the feature under test is Login." "Description" may be an optional feature which may enhance readability of the feature file. In one or more embodiments "descriptions" may run into multiple lines. It is noted that "Description" may not start with any of the Gherkin keywords. The file 108 may also include one or more tags 111, which may be prefixed with "@". As a non-exhaustive example of tags:
@FunctionalTest
Feature: Shopping cart Application Login
　The application under test in Shopping cart and the feature under test is Login
@SmokeTest @RegressionTest
Scenario: Successful Login
Given User is on login page
When User enters valid username and password
　And clicks on login button
Then User is logged into home page
　This scenario is for Successful login when user enters valid username and password
@RegressionTest
Scenario: Unsuccessful Login
Given User is on login page
When User enters invalid username and password
　And clicks on login button
Then User remains on Login page
　And error message is displayed
　This scenario is for unsuccessful login when user enters invalid username and password
@SmokeTest
Scenario: Add a product to bag
Given User has successfully logged in to application
When User clicks on add to cart button for any product
Then product is added to bag
　This scenario is for adding product successfully to bag
The tag 111 may be used to group scenarios and may be inherited. For example, when a tag 111 is added to a feature, all of the scenarios under that feature may inherit the tag 111. It is noted that tags 111 may be useful when planning a flow of execution in a test script. For example, the test script may be executed by executing the tags in a particular order or exempting some tags. In the above example, the whole feature file is tagged as "FunctionalTest." So, to execute all the scenarios, the tag "FunctionalTest" may be selected for execution. The tag "SmokeTest" or "RegressionTest" may also be selected for execution individually or in some order. The scenario "Successful login" may be executed in both the cases, as it has both the tags.

Figure 2:
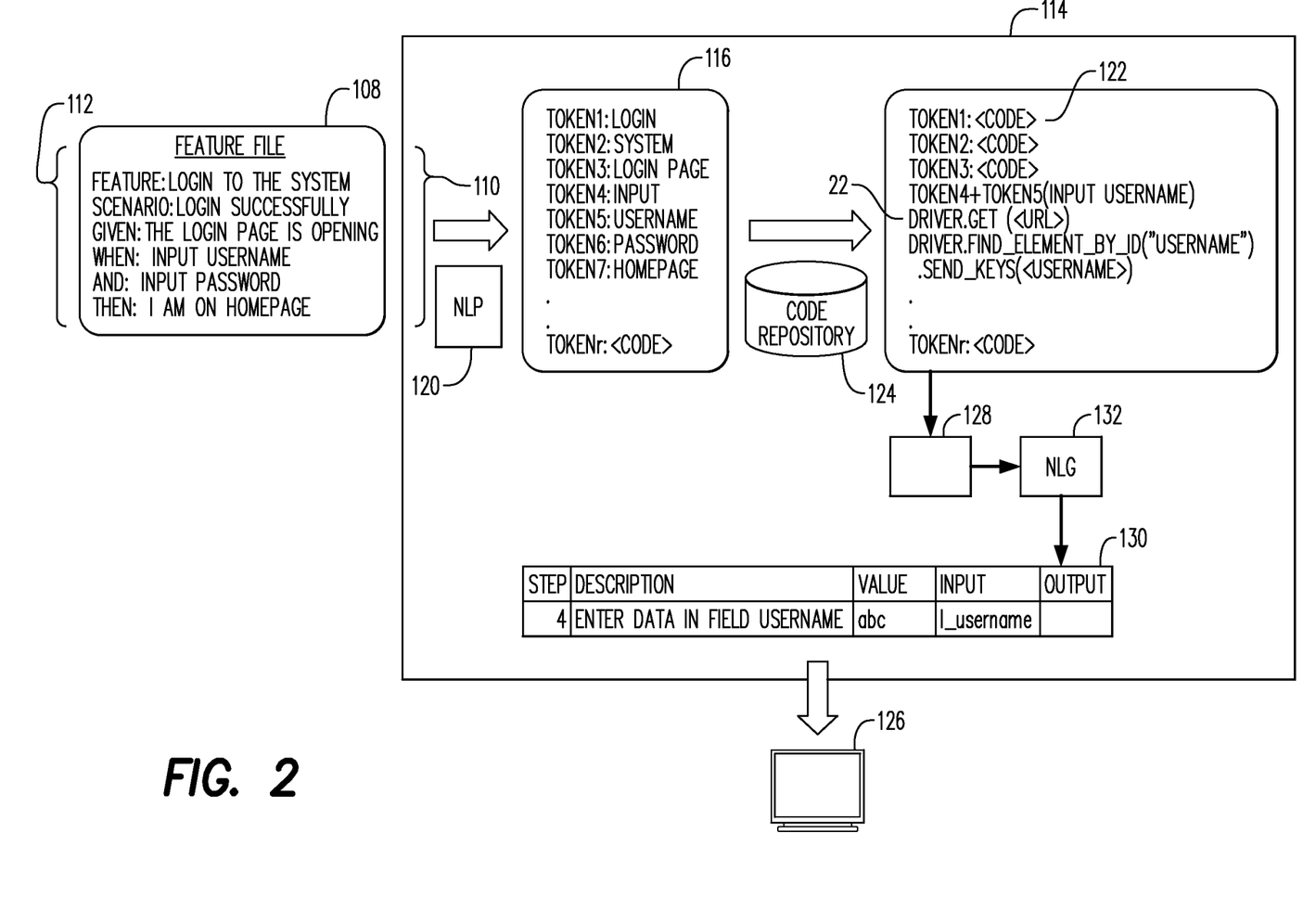
FIG. 2 is a block diagram of a system architecture according to some embodiments.

As a non-exhaustive example shown in FIGS. 1 and 2, the file 108 includes the keyword "Feature", and in S414, the user 102 enters data element 110 after the feature keyword 112 to test as "Login to the system". The feature may test the following scenario: when the user is on the login page, they input a username and password, and then the output is that the user is provided with the homepage of the system as a logged-in user. With respect to the file 108, the user 102 enters data element "login successfully" for the keyword "Scenario." The user 102 may also enter data elements 110 into the steps (Given, When, And, Then). Continuing with the non-exhaustive example shown in FIGS. 1 and 2, "Given" is "the login page is opening"; "When" is "input username"; "And" is "input password" and "Then" is "I am on Homepage."

Then, in S416 a Behavior Driven Development (BDD) test integration module 114 ("BDD module") may receive the file 108. In one or more embodiments, the file 108 may include a user-selectable option (not shown) to execute the file 108. Execution of the file 108 may, in one or more embodiments, transmit the file 108 to the BDD module 114.

The BDD module 114 transforms one or more elements in the file 108 into one or more corresponding tokens 116 in S418. In one or more embodiments, the BDD module 114 may execute a tokenization process 118. In one or more embodiments, the tokenization process 118 may include a natural language processor 120 to apply one or more natural language processing techniques (e.g., parsing, classification, stemming, tagging, and semantic reasoning) to the elements in the file to generate one or more tokens 116. As used herein, "tokenization" is the process of transforming a stream of texts into smaller words or phrases. The natural language processor 120 may include one or more sets of libraries and programs to execute the one or more natural language processing techniques. "Parsing" may refer to the grammatical analysis of a sentence. There may be two primary types of parsing: Dependency Parsing and Constituency parsing. Dependency parsing may focus on a relationship between words in a sentence (identifying primary objects, adjectives, etc.), while Constituency parsing may focus on separating strings as per context-free grammar rules. "POS tagging" may refer to a technique which determines a part of speech for each word, such as noun, verb, adjective, etc., using algorithms which may associate discrete terms, as well as hidden parts of speech as per a set of descriptive tags. POS-tagging algorithms may be either rule-based or stochastic. "Classification" or "named entity recognition" may locate and classify entities form text into pre-defined categories.

Continuing with the non-exhaustive example shown in FIG. 2, the BDD module 114 may receive the file 108 in S416, and transform the input 110 "login to the system; login successfully, the login page is opening, input user name, input password, I am on Homepage" into the following tokens: Token1: Login; Token2: System; Token3: Login page; Token4: Input; Token4: Username; Token6: Password; Token7: Homepage in S418. In one or more embodiments, all of the input in the file (e.g., feature, scenario, steps) may be tokenized.

Turning back to the process 400, in S420, the BDD module 114 maps each token 116 to a respective code 122 in a code repository 124 stored in a database 510 (FIG. 5), for example. The code repository 124 may be populated with code associated with the elements in the application under test 106. In one or more embodiments, the code repository is initially populated by running machine learning algorithms on the application. In one or more embodiments, the code repository 124 may also include code that may be used by the automated regression testing tool 126 to execute the test scripts.

Continuing with the non-exhaustive example in FIG. 2, the code repository 124 maps Token 4 and Token 5 (Input Username) to the following code: "driver.get (<URL>)" and "driver.find_element_by_id("Username").send_keys (<Username>)." In this example, the login page refers to a particular screen, so the first item to return is the location of that screen (e.g., URL). Then the code is instructive to find the particular field (username) within the particular page. Code is returned for each of Tokens1-Tokenn in the same manner.

Then in S422, a second test script file 128 is generated with the code in the code repository. The second test script file 128 may be an executable file that is written in the programming language of the code. For example, when the code repository 124 is used by an automatic regression testing tool that executes files written in JAVA, the second test script file may be written in JAVA. In one or more embodiments, this second test script file 128 may be executed to test the application under test, as described further below with respect to S430.

Figure 3:
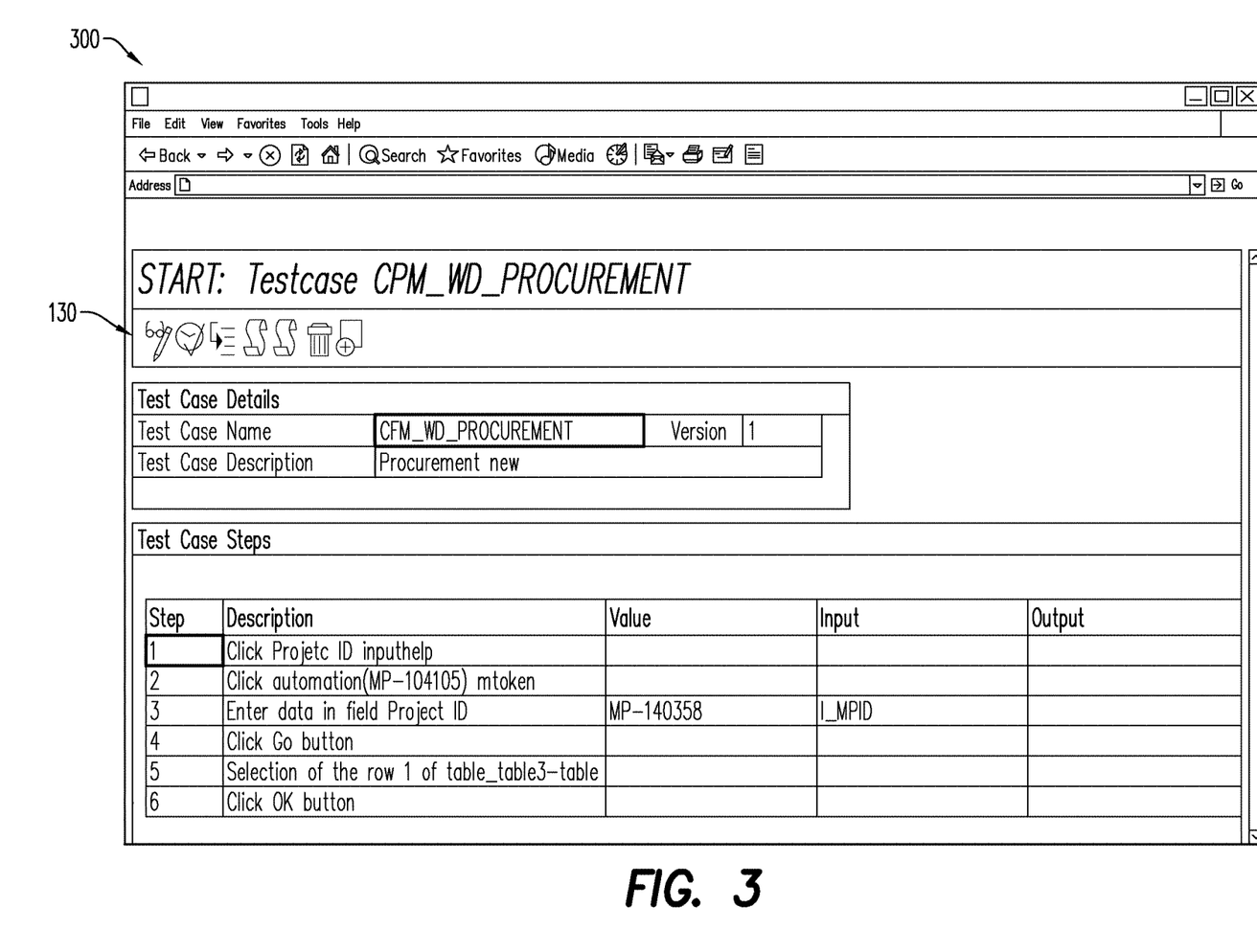
FIG. 3 is a non-exhaustive example of a test case in a natural language according to some embodiments.

After the second test script file 128 is generated, the second test script file 128 is transformed into a natural language file 130 by a natural language generation process executed by a natural language generator 132 in S424. As used herein, "natural language generation" is the task of generating natural language from a machine representation/programming language. The natural language generation process may include several stages including content determination (what information must be mentioned); document structuring and aggregation (overall structuring); and realization (creating actual text as per rules of syntax, etc.). As a non-exhaustive example, the natural language file 130 may be a Simple Test Automation for Regression Testing (START) file that may be executed by a START tool of SAP®. As shown in FIGS. 2 and 3, the natural language file 130 may include each of the steps in the feature file 108. It is noted that Gherkin files may be more elaborate than a START file. The Gherkin file may have a defined format: Given, When, Then. The Gherkin file may be understood by a user, even if they do not have much knowledge about the application. The START file may give a brief description of each action being performed (e.g., click on butt; expand link). A user may not be able to understand a START file without context. Each step may include a description of the step and any values or input for a given field. In one or more embodiments, the input column shows the name of the variable that is being used in that step and the value column contains the actual value being passed to the step (e.g., for entering username, the Input column will have "Username" and the Value column will have "ABC").

The natural language file 130 may be displayed to the user 102 in S426. The natural language file 130 may allow the user 102 to review the test script to confirm it is written as intended. It is noted that the natural language file 130 may hide the actual code of the second test script file 128 from the user 102, and instead provide an easy to understand file per the test case scenario in the feature file 108. The user 102 may save the natural language file 130 via selection of a save control (not shown). In one or more embodiments, selection of the save control may save both the natural language file 130 and the second test script file 128. As used herein, "test case" may include both the second test script file 128 and natural language file 130. In one or more embodiments, the second test script file 128 may be automatically saved after generation thereof.

After the user 102 reviews the natural language file 130 in S426, the user 102 may execute the natural language file in S428. In one or more embodiments, the second test script file/natural language file may be saved prior to execution thereof. In one or more embodiments, to execute the natural language file 130, the user 102 may open an automated regression testing tool ("tool") 126. From a user interface in the tool 126, the user may first select the application under test 106 via a drop-down menu, a radio button, data-entry field or any other suitable control (not shown). Selection of the application under test 106 may cause the system 100/500 to retrieve the application under test. For example, selection of the application under test 106 may open a browser 134 and retrieve a uniform resource locator (URL) for the selected application under test. The browser 134 may be any suitable browser (e.g., Chrome, InternetExplorer, Firefox, etc.) that supports the user automated regression testing tool 126. Then the user may select the natural language file 130 for execution. The natural language file 130 may be selected via a drop-down menu, a radio button, data-entry field or any other suitable control (not shown). In one or more embodiments, selection of the natural language file 130 may automatically execute the second test script file 128 to test the application under test in S430. In one or more embodiments, executing the generated second test script includes executing the one or more steps in a playback mode.

A log is generated if S432 indicating whether the application under test passed the executed test case. In one or more embodiments, if the application under test did not pass, the log may indicate the location of the failure. As a non-exhaustive example, if the test script includes a step to enter a user name, but the application under test cannot find a user name, or cannot find the user name in a given amount of time, the application under test may fail. When the application under test fails, as indicated by the log, corrective action may be taken (e.g., change how the feature is deployed, change the test script, etc.)

While the BDD module 114 is described above as operating outside of the automated regression testing tool 126, it may also operate within the automated regression testing tool. For example, operation of the BDD module 114 may be a selectable option within the automated regression testing tool 126. In that instance, a first step may be to open the automated regression testing tool 126, and a second step may be to select the BDD module 114. The third step may be to open a text editor/word processing file 108 as in S412, described above, but in this case within the automated regression testing tool 126. The process 400 may then continue as described above.

It is noted that the order of steps may be changed. For example, If the user initially clicks on Button 1, then Button 2, then Button 3 and there is any change in the business process, then the order may be changed to Button 1, Button 3 and Button 2.

FIG. 5 is a block diagram of system architecture 500 according to some embodiments. Embodiments are not limited to architecture 500 or to a three-tier database architecture.

Architecture 500 includes database 510, database management system (DBMS) 520, application server 530, applications 535, clients 540, a developer 550, an automated regression testing tool 126, a test application 109, and a BDD module 114. Applications 535 may comprise server-side executable program code (e.g., compiled code, scripts, etc.) executing within application server 530 to receive queries from clients 540 and provide results to clients 540 based on data of database 510. A developer 550 or client 540 may access the BDD module 114 executing within application server 530, to generate a test script to test a feature in an application under test 106.

Application server 530 provides any suitable interfaces through which the client 540 and developer 550 may communicate with the BDD module 114 or applications 535 executing on application server 530. For example, application server 530 may include a HyperText Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

One or more applications 535 executing on server 530 may communicate with DBMS 520 using database management interfaces such as, but not limited to, Open Database Connectivity (ODBC) and Java Database Connectivity (JDBC) interfaces. These types of applications 535 may use Structured Query Language (SQL) to manage and query data stored in database 510.

DBMS 520 serves requests to retrieve and/or modify data of database 510, and also performs administrative and management functions. Such functions may include snapshot and backup management, indexing, optimization, garbage collection, and/or any other database functions that are or become known. DBMS 520 may also provide application logic, such as database procedures and/or calculations, according to some embodiments. This application logic may comprise scripts, functional libraries and/or compiled program code.

Application server 530 may be separated from, or closely integrated with, DBMS 520. A closely-integrated application server 530 may enable execution of server applications 535 completely on the database platform, without the need for an additional application server. For example, according to some embodiments, application server 530 provides a comprehensive set of embedded services which provide end-to-end support for Web-based applications. The services may include a lightweight web server, configurable support for OData, server-side JavaScript execution and access to SQL and SQLScript.

Application server 530 may provide application services (e.g., via functional libraries) which applications 535 may use to manage and query the data of database 510. The application services can be used to expose the database data model, with its tables, hierarchies, views and database procedures, to clients. In addition to exposing the data model, application server 530 may host system services such as a search service.

Database 510 may store data used by at least one of: applications 535 and the BDD module 114. For example, database 510 may store one or more code repositories accessed by the BDD module 114 during execution thereof.

Database 510 may comprise any query-responsive data source or sources that are or become known, including but not limited to a structured-query language (SQL) relational database management system. Database 510 may comprise a relational database, a multi-dimensional database, an eXtendable Markup Language (XML) document, or any other data storage system storing structured and/or unstructured data. The data of database 510 may be distributed among several relational databases, dimensional databases, and/or other data sources. Embodiments are not limited to any number or types of data sources.

In some embodiments, the data of database 510 may comprise one or more of conventional tabular data, row-based data, column-based data, and object-based data. Moreover, the data may be indexed and/or selectively replicated in an index to allow fast searching and retrieval thereof. Database 510 may support multi-tenancy to separately support multiple unrelated clients by providing multiple logical database systems which are programmatically isolated from one another.

Database 510 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Developer 550 and client 540 may comprise one or more individuals or devices executing program code of a software application for presenting and/or generating user interfaces to allow interaction with application server 530 (e.g., generating a test script to test features of an application). Presentation of a user interface as described herein may comprise any degree or type of rendering, depending on the type of user interface code generated by application server 130.

For example, a client 540 or developer 550 may execute a Web Browser to request and receive a Web page (e.g., in HTML format) from a website application 535 of application server 530 via HTTP, HTTPS, and/or WebSocket, and may render and present the Web page according to known protocols. The client 540 or developer 550 may also or alternatively present user interfaces by executing a stand-alone executable file (e.g., an .exe file) or code (e.g., a JAVA applet) within a virtual machine.

Figure 6:
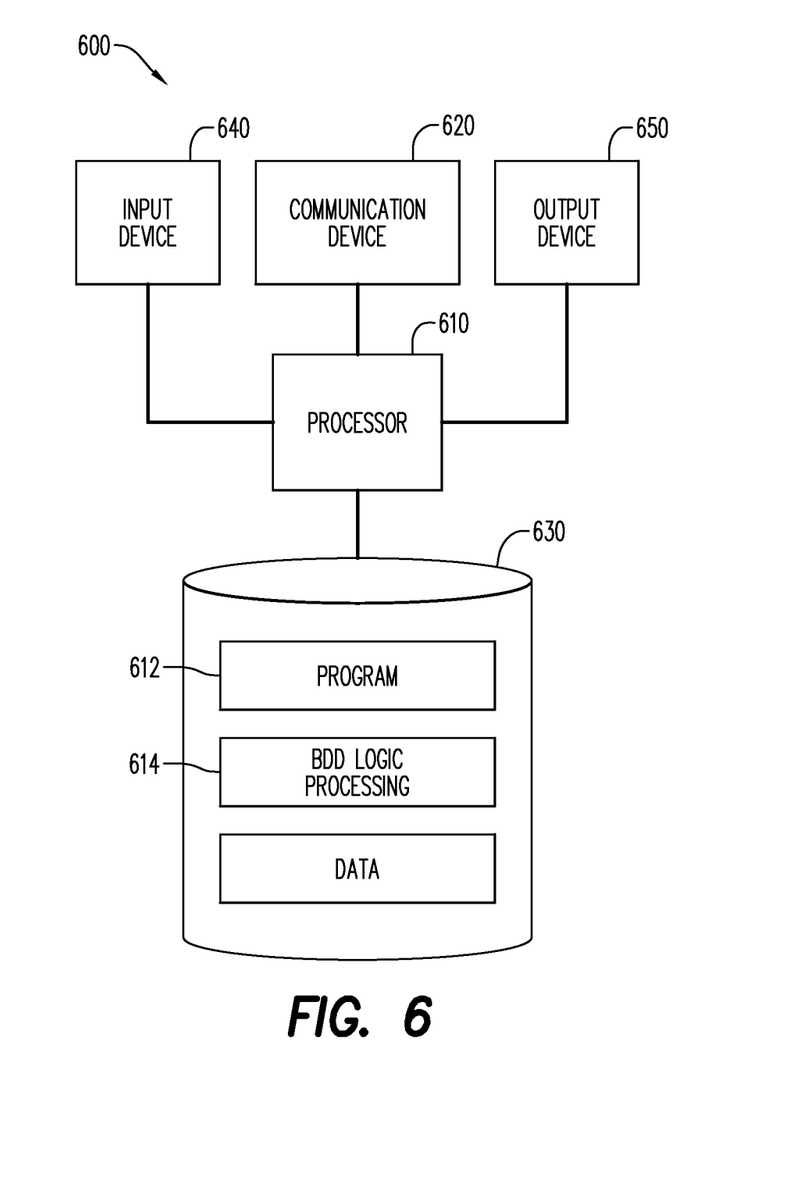
FIG. 6 is a block diagram of a system according to some embodiments.

FIG. 6 is a block diagram of apparatus 600 according to some embodiments. Apparatus 600 may comprise a general-or special-purpose computing apparatus and may execute program code to perform any of the functions described herein. Apparatus 600 may comprise an implementation of one or more elements of system 500. Apparatus 600 may include other unshown elements according to some embodiments.

Apparatus 600 includes a BDD processor 610 operatively coupled to communication device 620, data storage device/memory 630, one or more input devices 640, and one or more output devices 650. Communication device 620 may facilitate communication with external devices, such as application server 530. Input device(s) 640 may comprise, for example, a keyboard, a keypad, a mouse or other pointing device, a microphone, knob or a switch, an infrared (IR) port, a docking station, and/or a touch screen. Input device(s) 640 may be used, for example, to manipulate graphical user interfaces and to input information into apparatus 600. Output device(s) 650 may comprise, for example, a display (e.g., a display screen) a speaker, and/or a printer.

Data storage device/memory 630 may comprise any device, including combinations of magnetic storage devices (e.g., magnetic tape, hard disk drives and flash memory), optical storage devices, Read Only Memory (ROM) devices, Random Access Memory (RAM) etc.

The storage device 630 stores a program 612 and/or BDD platform logic 614 for controlling the processor 610. The processor 610 performs instructions of the programs 612, 614, and thereby operates in accordance with any of the embodiments described herein, including but not limited to process 400.

The programs 612, 614 may be stored in a compressed, uncompiled and/or encrypted format. The programs 612, 614 may furthermore include other program elements, such as an operating system, a database management system, and/or device drivers used by the processor 610 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A computer-implemented method comprising:
receiving a first test script in a file as text;
receiving the file at a Behavior Driven Development (BDD) test integration module;
transforming one or more elements under test in the test script into one or more corresponding tokens, wherein executable code to test the one or more elements is derived from the one or more corresponding tokens;
mapping each of the tokens to a respective code in a code repository, wherein the respective code that populates the code repository is associated with the one or more elements under test;
generating a second test script from the code;
transforming the generated second test script to generate a natural language file; and
executing the generated second test script and the generated natural language file.

2. The method of claim 1, wherein the first test script is received in the file in a rule-based and structured language.

3. The method of claim 2, wherein the rule-based and structured language is Gherkin.

4. The method of claim 1, wherein a natural language processor transforms the one or more elements into the one or more corresponding tokens.

5. The method of claim 1, further comprising:
displaying the transformed generated second test script on a user interface.

6. The method of claim 1, wherein the one or more received elements create a new test script or edit an existing test script.

7. The method of claim 1, wherein executing the generated second test script further comprises:
executing the one or more steps in a playback mode.

8. The method of claim 1, wherein the file includes a keyword at a beginning of each line of text in the file.

9. The method of claim 1 further comprising:
displaying the natural language to a user; and
verifying the generated second test script is written as intended based on the displayed natural language, wherein the verification is prior to execution of the generated second test script.

10. The method of claim 1, wherein execution of the natural language file automatically executes the second test script.

11. A system comprising:
a display;
a memory storing processor-executable steps;
a Behavior Driven Development (BDD) test integration module; and
a BDD test integration processor in communication with the BDD test integration module and operative to execute the processor-executable process steps to cause the system to:
receive a first test script in a file as text in a rule-based and structured language;
receive the file at a Behavior Driven Development (BDD) test integration module;
transform one or more elements under test in the test script into one or more corresponding tokens, wherein executable code to test the one or more elements is derived from the one or more corresponding tokens;
map each of the tokens to a respective code in a code repository, wherein the respective code that populates the code repository is associated with testing of the one or more elements under test;
generate a second test script from the code;
transform the generated second test script to generate a natural language file; and execute the generated second test script and the generated natural language file.

12. The system of claim 11, wherein the rule-based and structured language is Gherkin.

13. The system of claim 12, further comprising a natural language generator operative to transform the generated second test script into natural language.

14. The system of claim 11, wherein a natural language processor transforms the one or more elements into the one or more corresponding tokens.

15. The system of claim 11, further comprising:
a display operative to display the transformed generated second test script on a user interface.

16. The system of claim 11, wherein the one or more received steps create a new test script or edit an existing test script.

17. The system of claim 11, wherein executing the generated second test script further comprises process steps to cause the system to:
execute the one or more steps in a playback mode.

18. The system of claim 11, wherein the file includes a keyword at a beginning of each line of text in the file.

19. A non-transitory computer-readable medium storing program code, the program code executable by a computer system to cause the computer system to:
receive a first test script in a file as text in a rule-based and structured language;
receive the file at a Behavior Driven Development (BDD) test integration module;
transform one or more elements under test in the test script into one or more corresponding tokens, wherein executable code to test the one or more elements is derived from the one or more corresponding tokens;
map each of the tokens to a respective code in a code repository, wherein the respective code that populates the code repository is associated with the one or more elements under test;
generate a second test script from the code;
transform the generated second test script to generate a natural language file; and
execute the generated second test script and the generated natural language file.

20. The medium of claim 19, wherein the rule-based and structured language is Gherkin.

21. The medium of claim 19, wherein a natural language processor transforms the one or more elements into the one or more corresponding tokens.

* * * * *